United States Patent [19]

Ching

[11] 3,781,686

[45] Dec. 25, 1973

[54] DIFFERENTIAL PULSE CODE COMMUNICATIONS SYSTEM HAVING DUAL QUANTIZATION SCHEMES

[75] Inventor: Yau Chau Ching, Morganville, N.J.

[73] Assignee: Bell Telephone Laboratories, Incorporated, Murray Hill, N.J.

[22] Filed: Nov. 13, 1972

[21] Appl. No.: 306,019

[52] U.S. Cl. ............ 325/38 B, 179/15 AD, 325/13, 325/42, 325/141, 325/324, 332/11 D

[51] Int. Cl. .......................... H04b 1/00, H04b 7/00

[58] Field of Search .................. 325/38 R, 38 B, 13, 325/42, 141, 321, 323, 324; 179/15 AP, 15 AV, 15 AD; 332/11 R, 11 D

[56] References Cited

UNITED STATES PATENTS 3,609,552 9/1971 Limb ................................ 325/38 B

*Primary Examiner*—Robert L. Richardson
*Assistant Examiner*—Marc E. Bookbinder
*Attorney*—W. L. Keefauver et al.

[57] ABSTRACT

A differential pulse code communications system is disclosed wherein the transmitter quantizes differential signals on two quantizing scales having different numbers of levels. The combined signal is transmitted to a receiver which may either utilize the higher quality signal or re-transmit either the lower and/or higher quality signal, without re-quantization and the error associated therewith, to yet another receiver; the quality of the signal re-transmitted being determined by the bandwidth of the re-transmission channel.

9 Claims, 7 Drawing Figures

PATENTED DEC 25 1973 3,781,686

SHEET 5 OF 5

DIFFERENTIAL PULSE CODE COMMUNICATIONS SYSTEM HAVING DUAL QUANTIZATION SCHEMES

BACKGROUND OF THE INVENTION

This invention relates to the reduction of quantization error in differential pulse code communications systems.

In prior art differential pulse code communications systems, the difference between the input message signal at a given sample instant and the absolute magnitude of the coded signal at the previous sample instant is quantized into a digital signal having one of a predetermined number of discrete quantizing levels. The greater the number of quantization levels into which the difference signal may be quantized, the smaller the quantization error, the closer the decoded signal approximates the input signal. However, as the number of quantization levels increases, more bits are required to represent the larger number of quantization levels. The number of bits that may be employed is in turn limited by the information-carrying capacity of the transmission channel which must have a wide enough bandwidth to transmit the digital signal. The maximum number of quantization levels that can be transmitted for each sampled difference is thus determined by the bandwidth of the transmission channel.

At the receiver of the prior art differential pulse code communications systems, the received digital difference signals are accumulated and the analog signal recovered and fed to a utilization device. However, it may also be necessary to re-transmit the digital signal to a second receiver at another distant location. As noted above, the number of quantization levels which may be transmitted are determined by channel bandwidth. The transmission channel over which the digital signal must be re-transmitted may not, however, have sufficient information-carrying capacity to re-transmit the received digital signal. The received higher grade quality signal must, therefore, be degraded to a signal having fewer quantization levels before it can be re-transmitted over the transmission channel having the narrower bandwidth. The resultant quantization error of the re-transmitted digital signal is the sum of the quantization error incurred by degrading the high grade quality signal to a lower grade quality signal for re-transmission plus the quantization error incurred by converting the analog signal to its quantized digital representation. The total quantization error of the re-transmitted signal is greater than the quantization error that would have resulted had the analog signal been orginally quantized into the lower quality signal. Other prior art systems eliminated this large double quantization error by initially quantizing the difference signal at the first transmitter into a digital signal having a number of discrete quantizing levels that could be transmitted over the re-transmission channel. The cost of this procedure is, however, that a lower quality signal is received by the utilization device at the first receiver.

An object of this invention is, therefore, to quantize and transmit a differential signal in such a manner that a higher grade quality signal may be transmitted to a receiver where it may be systematically degraded to a lower quality signal for re-transmission without introducing additional quantization error into the system.

SUMMARY OF THE INVENTION

The differential pluse code communications system of the present invention employs a transmitter which quantizes differential signals on two scales having different numbers of levels. The combined signal is then transmitted to a receiver which may either utilize the higher quality signal or re-transmit lower and/or higher quality signal, without re-quantization and the error associated therewith, to yet another receiver; the quality of the signal re-transmitted being determined by the bandwidth of the re-transmission channel. A high quality signal may thus be transmitted without the double quantization error which the prior art incurred by re-quantizing to a lower quality signal at the distant receiver.

In the present transmitter the difference signal input to the quantizing network is formed by subtracting a feedback signal from the input message signal. A quantizing circuit encodes the difference signal into a digital signal having one of a predetermined number of quantizing levels determined by the lower quality transmission channels in the system; i.e., the channels with the narrower bandwidths. An accumulator circuit then adds this comparitively low quality quantized difference signal to the previously quantized difference signals. The signal fed back and subtracted from the input message signal to form the difference input signal in the quantizing circuit is therefore a delayed representation of the accumulation of previously quantized difference signals.

Once the quantization of the difference signal on the quantizing scale having the lesser number of possible levels has thus been determined, the quantization of the difference signal on the quantizing scale having the greater number of possible levels must be derived to provide a higher quality output signal which may be transmitted over channels with relatively wide bandwidths. In accordance with the present invention, this higher quality signal is obtained by subtracting the difference between the input message signal and the accumulated lower quality quantized difference signals and combining the resultant difference, which is a measure of the preciseness of the approximation of the quantized lower quality signal to the input message signal, with the quantized difference signal at the output of the quantizer circuit. The combined signal thus has a greater number of quantization levels and is of a higher quality than the quantized signal at the output of the quantizing circuit.

In accordance with the present invention, the higher quality signal and the lower quality signal may both be recovered at a receiver by separating the lower quality signal component from the combined signal transmitted by the transmitter. The absolute magnitude of the higher quality signal is reconstructed by summing the received higher grade quality difference signal with a delayed accumulation of the lower grade quality difference signals.

Since a lower quality signal, equivalent to the lower quality signal in the feedback path of the transmitter, may be derived from the received higher grade quality difference signal, the lower grade quality difference signal may be re-transmitted to another distant location without re-quantization and the error associated therewith, at the receiver.

BRIEF DESCRIPTION OF THE DRAWINGS

Other objects and features of the present invention will readily be apparent from the following discussion and drawings:

FIG. 2A is arranged to the left of FIG. 2B, comprise a block diagram of a differential pulse code communications system embodying the present invention;

DETAILED DESCRIPTION

Figure 1:
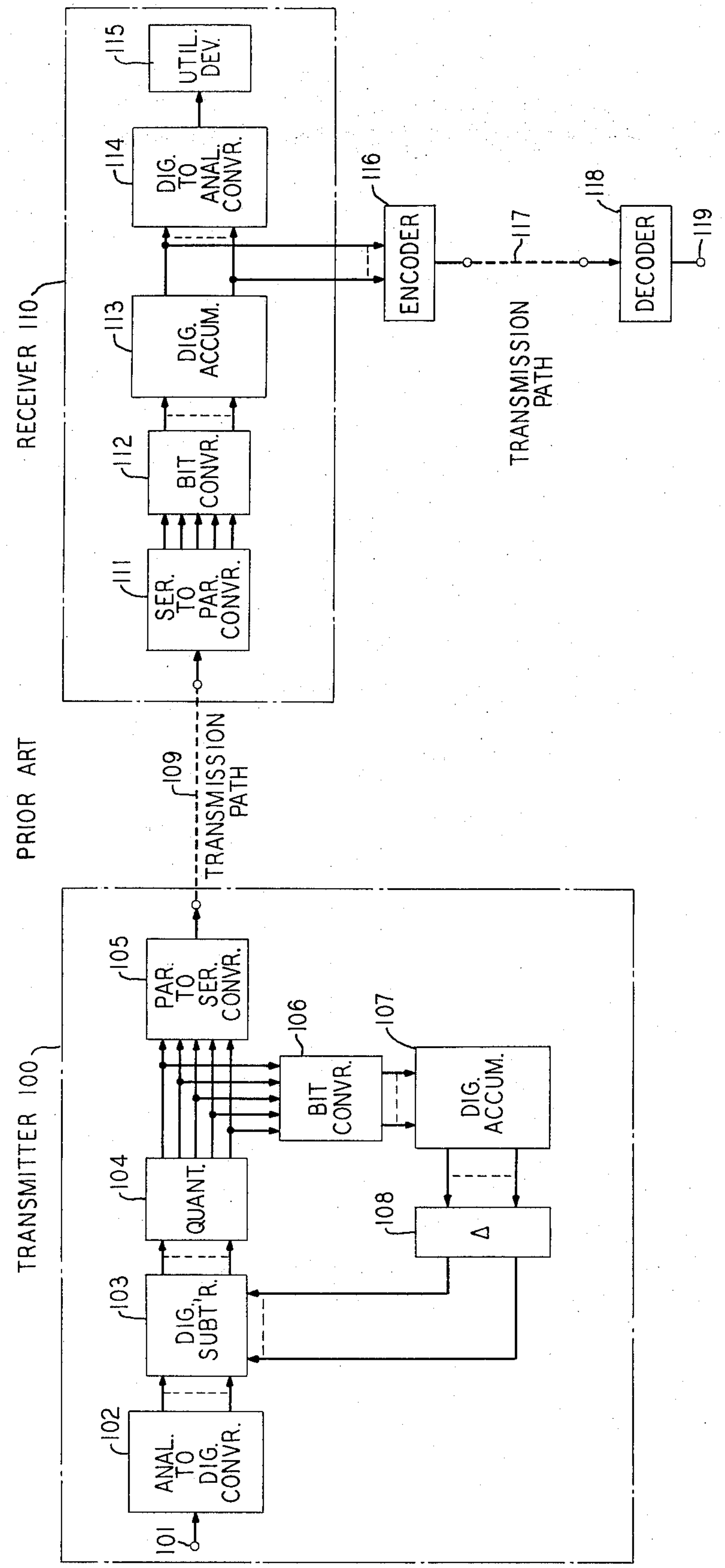
FIG. 1 is a block diagram of a prior art differential pulse code communications system.

FIG. 1 illustrates a prior art differential pulse code communications system in which differential signals are quantized and encoded for transmission to a distant receiver. At transmitter 100, an analog message signal is applied to input terminal 101 and passed to analog-to-digital converter 102. The message signal is sampled at periodic intervals and the absolute magnitude of each sample is represented by a pulse code appearing in parallel format on a plurality of output leads. The pressure or absence of a signal on each of the plurality of output leads determines the pulse code. For present illustrative purposes, it will be assumed that the magnitude of each sampled message signal is represented by a pulse code appearing on eight output leads or, in other words, each sampled message signal may be digitally represented by any one of 256 quantization levels. For purposes of discussion hereinafter, it will be additionally assumed that the pulse code at the output analog-to-digital converter 102 represents the input message signal with negligible quantization error.

The pulse code at the output of analog-to-digital converter 102 is passed to quantizer circuit 104 through digital subtractor circuit 103. The pulse code appearing on the eight output leads of digital subtractor circuit 103 represents the difference between the digital message signal at the output of analog-to-digital converter 102 and a digital feedback signal. This output difference signal is quantized by quantizer circuit 104 to a signal having, for present illustrative purposes, 32 predetermined discrete levels. A unique combination of the conditions of the signals on five leads at the output of quantizer circuit 104 represents the number, from one to 32 of each quantized level. Parallel-to-serial converter 105 is connected to the output leads of quantizer circuit 104 to convert the pulse code at the output of quantizer circuit 104 to serial format for transmission over transmission path 109 to receiver 110.

The output leads of quantizer circuit 104 are also connected to bit converter 106. But converter 106 converts the 5-bit parallel pulse code at the output of quantizer circuit 104, representing the number of the quantized level, to an 8-bit parallel code representing the magnitude of the quantized difference signal. The eight output leads of bit converter 106 are connected to digital accumulator 107 in which the magnitudes of each quantized difference signal are digitally accumulated. At a given sample instant, the 8-bit pulse code appearing on the output leads of digital accumulator 107 represents the absolute magnitude of the quantized message signal. Delay network 108 delays the pulse code appearing at the output of digital accumulator by one sample instant. The output leads of delay network 108 are connected to a second set of input leads of digital subtractor circuit 103 and the digital difference signal formed therein is equal to the difference between the digitally converted input message signal at a given sample instant and the absolute magnitude of the quantized input message signal at the previous sample instant.

As heretofore noted, the 5-bit parallel data at the output of quantizer circuit 104 is converted to serial format by parallel-to-serial converter 105 for transmission over transmission path 109 to receiver 110. At receiver 110, serial-to-parallel converter 111 decodes the transmitted code and produces a pulse code on five output leads equivalent to the 5-bit parallel code at the output of quantizer circuit 104. The output leads of serial-to-parallel converter 111 are connected to bit converter 112 in which the received 5-bit code, representing one of 32 quantizing levels, is converted to an 8-bit representation of the magnitude of the transmitted quantized difference signal. Digital accumulator 113 accumulates the magnitudes of the quantized difference signals to produce an 8-bit code representative of the absolute magnitude of the quantized input message signal. Digital-to-analog converter 114 converts the 8-bit pulse code on the output leads of digital accumulator 113 into analog format where the analog signal, representative of the input message signal at input terminal 101, is fed to utilization device 115.

This prior art system is satisfactory except for those practical situations when it is necessary to re-transmit the pulse code that represents the absolute magnitude of the input message signal to another distant location over a channel having a bandwidth narrower than the bandwidth of the original channel. In re-transmission situations, the 8-bit pulse code appearing on the eight output leads of digital accumulator 113 is fed to encoder 116 in which the pulse code is converted to a digital format for transmission over transmission path 117. The received digital signal is decoded and converted to analog format by decoder 118. If transmission path 117 has the same information-carrying capacity as transmission path 109, then the 8-bit pulse code at the output of digital accumulator 113 may be encoded by encoder 116 in a manner similar to that employed at transmitter 100 without any loss of information. Thus at each sample instant, a coded digital difference signal may be transmitted by encoder 116 equivalent to the coded digital difference signal transmitted between transmitter 100 and receiver 110 and no additional quantization error will be introduced. The decoded analog signal at terminal 119 is therefore equivalent to the analog signal fed to utilization device 115 and differs at each sample instant from the message signal at terminal 101 by the quantization error introduced by only quantizer circuit 104 at transmitter 100.

Often, however, because of multiplexing, the bandwidth of transmission path 117 may be narrower than the bandwidth of transmission path 109. Thus, whereas transmission path 109 may be able to transmit a digital signal having one of 32 possible levels at each sample, the bandwidth of transmission path 117 may be, for example, capable of transmitting a digital signal representing only one of 16 possible levels at each sample. Therefore, an additional quantization error is introduced by encoder 116 when the 32-level quality signal must be quantized to 16-level quality for re-transmission over transmission path 117. At each sample instant, the analog signal at the output terminal 119 of decoder 118 will differ from the input message signal at terminal 101 by the quantization error introduced by quantizer circuit 104 plus the quantization error introduced by encoder 116. The resultant quantization error at output terminal 119 from the 32-level quantization at quantizer circuit 104, plus the quantization error from the 16-level quantization at encoder 115, is greater than the error that would have resulted had quantizer circuit 104 originally quantized the difference signal into 16 levels.

In order to reduce the quantization error of the analog signal at output terminal 119 in such a system, quantizer circuit 104 could be modified to encode the difference signal at the output of digital subtractor circuit 103 into only 16 possible levels. The result of reducing the number of quantization levels of quantizer circuit 104, however, is to reduce the quality of the analog signal supplied to utilization device 115. Therefore, when quantizer circuit 104 employs 16-level quantization the signal supplied to utilization device 115 will not approximate the input message signal as well as had 32-level quantization been used. The conflict exists, therefore, for the desire of a high quality signal at utilization device 115, and the desire to prevent the introduction of additional quantization error by encoder 116.

Figure 2A:
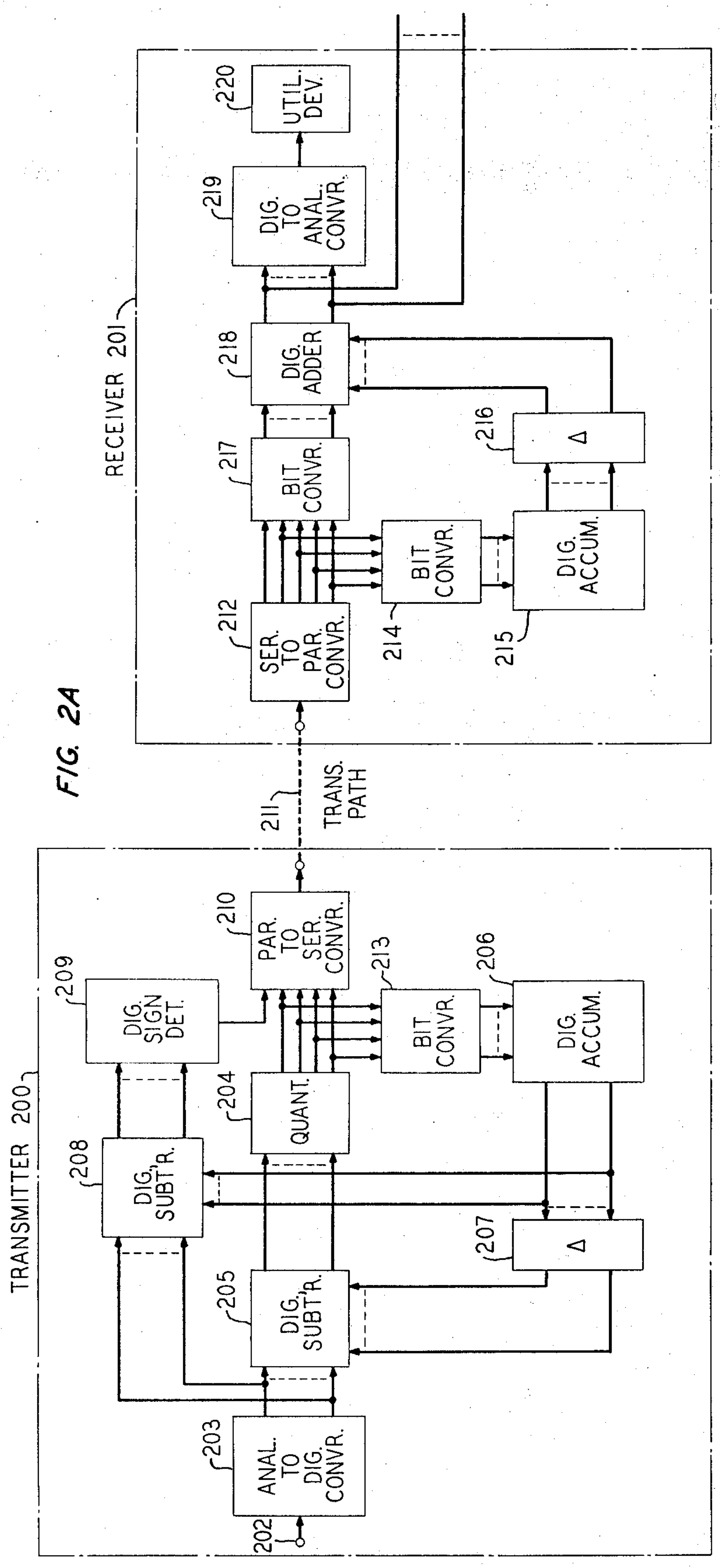
FIGS. 2A and 2B, when
Figure 2B:
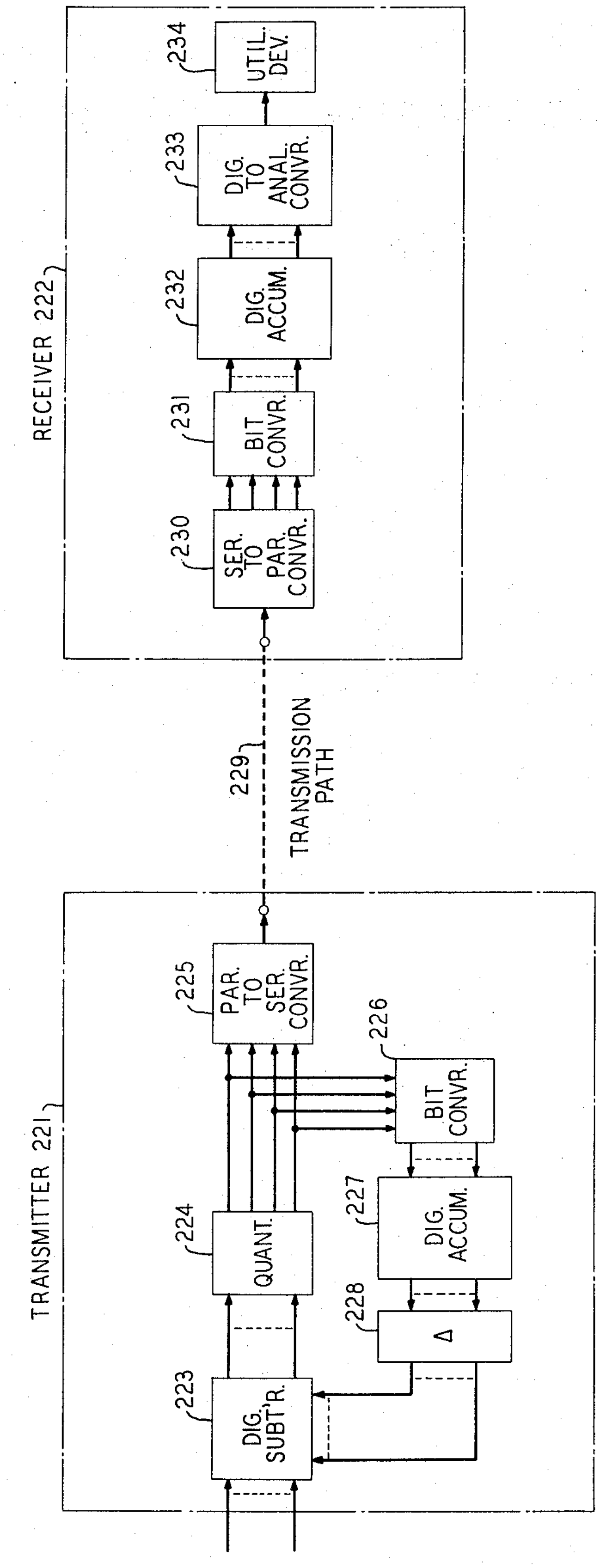

In the differential pulse code communications system embodying the present invention, illustrated in the combination of FIGS. 2A and 2B, a difference signal is quantized at transmitter 200 such that the received digital signal at receiver 201 may be systematically degraded to a lower quality signal for re-transmission without introducing additional quantization error. Thus, at transmitter 200 a difference signal is quantized into both a lower quality signal having a lesser number of quantization levels and a higher quality signal having a greater number of quantization levels. In the following discussion it will be assumed that the lower quality signal has 16 possible levels and the higher quality signal has 32 possible levels, to facilitate comparison with the prior art system of FIG. 1.

As will be subsequently apparent, the lower quality 16-level signal is derived using techniques similar to those employed in the prior art system of FIG. 1. An analog message signal is applied to input terminal 202 and passed to analog-to-digital converter 203. The message signal is sampled at periodic intervals by analog-to-digital converter 203 and the absolute magnitude of each sample is represented by a pulse code appearing in parallel format on a plurality of output leads. The pressure or absence of a signal on each of the plurality of output leads determines the pulse code. For ready comparison with the prior art system of FIG. 1, it will be again assumed that the magnitude of the sampled message signal is represented by a pulse code appearing on eight output leads or, in other words, each sampled message signal may be digitally represented by any one of 256 quantization levels. The pulse code at the output of analog-to-digital converter 203 will therefore be assumed, as in the discussion of the prior art, to digitally represent the message signal with negligible quantization error.

The pulse code at the output of analog-to-digital converter 203 is passed to quantizer circuit 204 through digital subtractor circuit 205. The pulse code appearing on the eight output leads of digital subtractor circuit 205 represents the difference between the digital message signal at the output of analog-to-digital converter 203 and a digital feedback signal. This output difference signal is quantized by quantizer circuit 204 to a signal having 16 discrete levels. A unique combination of the conditions of the signals on four output leads of quantizer circuit 204 represents the number, from one to 16, of each quantized level. Several conventional quantizers well known in the art could be used to represent the quantized signal by a pulse code on a plurality of output leads.

The output leads of quantizer circuit 204 are connected to bit converter 213. Bit converter 213 transforms each 4-bit code representing the number, from one to 16, of the quantized level on the 16-level scale into an 8-bit code representing the amplitude of each quantized level. Bit converter 213 may be any compatible network known in the art capable of transforming each parallel digital input pulse code into unique parallel digital output pulse code, as for example a logic circuit, a switching matrix, or a "read only" memory. The integrated circuit pack "read only" memory designated as SN-7488A by Texas Instrument, Incorporated, has been found to be satisfactory for this purpose. The output leads of bit converter 213 are connected to digital accumulator 206 in which the coded magnitudes of each digital quantized difference signal are digitally accumulated. The 8-bit pulse code appearing on the output leads of digital accumulator 206 represents the absolute magnitude of the 16-level quantized high quality digital signal at the output of analog-to-digital converter 203, and, therefore, also the analog message signal at the sample instant. The pulse code appearing at the output of digital accumulator 206 is delayed one sample interval by delay network 207 before being applied to digital subtractor circuit 205. The digital difference signal at the output of digital subtractor circuit 205, formed by subtracting the output of delay network 207 from the output of analog-to-digital converter 203, is therefore, equal to the difference between the high quality digital signal at the output of analog-to-digital converter 203 at a given sample instant and the 16-level coded high quality digital input at the previous instant.

The digital difference signal at the output of digital subtractor circuit 205 has been quantized into the lower quality 16-level signal as described heretofore in accordance with the prior art as discussed in connection with FIG. 1. In the present invention, the digital difference signal at the output of digital subtractor circuit 205 is also quantized into the higher quality 32-level signal. The digital difference signal transmitted by transmitter 200 to receiver 201 will thus have 32-quantization levels as does the transmitted prior art signal. However, unlike the prior art signal, the received 32-level difference signal may be converted, for re-transmission, to the 16-level difference signal at the output of quantizer circuit 204 without having to re-quantize the received signal.

The 32-level quantized difference signal at transmitter 200 is formed by adding additional quantization information to the 16-level quantized difference signal at the output of quantizer circuit 204. Output terminals of analog-to-digital converter 203 and the output terminals of digital accumulator 206 are connected to digital subtractor circuit 208 wherein the digital representation of the absolute magnitude of the 16-level quantized input signal is substracted from the high quality digital signal at the output of analog-to-digital converter 203. A pulse code representing the resultant difference appears in parallel format on the eight output leads of the digital subtractor circuit 208 which are connected to digital sign detector 209. The sign of the difference signal on the eight output leads of digital subtractor circuit 208 is represented by the presence or absence of a signal on an output lead of digital sign detector 209. The difference signal formed by subtracting the 16-level quantized input signal at the output of digital accumulator 206 from the high quality digital signal at the output of analog-to-digital converter 203 is therefore representative of the quantization error introduced and thus the precision of the 16-level quantized signal as an approximation to the high quality digital signal at the output of analog-to-digital converter 203. By examining the resultant difference, additional quantization information is available for transmission to the receiver. Thus, by examining the sign of the difference at the output of digital subtractor circuit 208 it can be determined whether the 16-level coded signal representation is greater than or less than the high quality digital signal at the output of analog-to-digital converter 203. The effect of such information is to increase the number of quantization levels into which the difference signal at the output of digital subtractor circuit 205 is quantized. Therefore, whereas quantizer circuit 204 quantizes the high quality digital input signal into 16 levels, the additional bit of information represented by the presence or absence of a signal at the output of sign detector 209 increases the effective number of quantization levels available for transmission to 32 levels. Unlike the prior art, however, the 32-level signal has as a component a 16-level signal which may be recovered at the receiver for re-transmission over a transmission path having an information carrying capacity limited to a 16-level signal.

The four output leads of quantizer circuit 204 and the output lead from digital sign detector 209 are connected to parallel-to-serial converter 210. The combination of the parallel 4-bit code representing one of 16 levels plus the additional sign determinative fifth bit are converted to serial format for transmission over transmission path 211 to receiver 201. The fifth bits of information transmitted at each sample time over transmission path 211, therefore, contain a code representing one of 32 quantization levels into which the digital differential signal at the output of digital subtractor circuit 205 is quantized. Imbedded within the transmitted five bits, however, are four bits which represent, on a different quantizing scale, one of 16 quantization levels into which the same digital differential signal is quantized. As will be described in detail hereinafter, these four bits, representing one of 16 quantization levels, can be recovered at the receiver for re-transmission.

Figure 3:
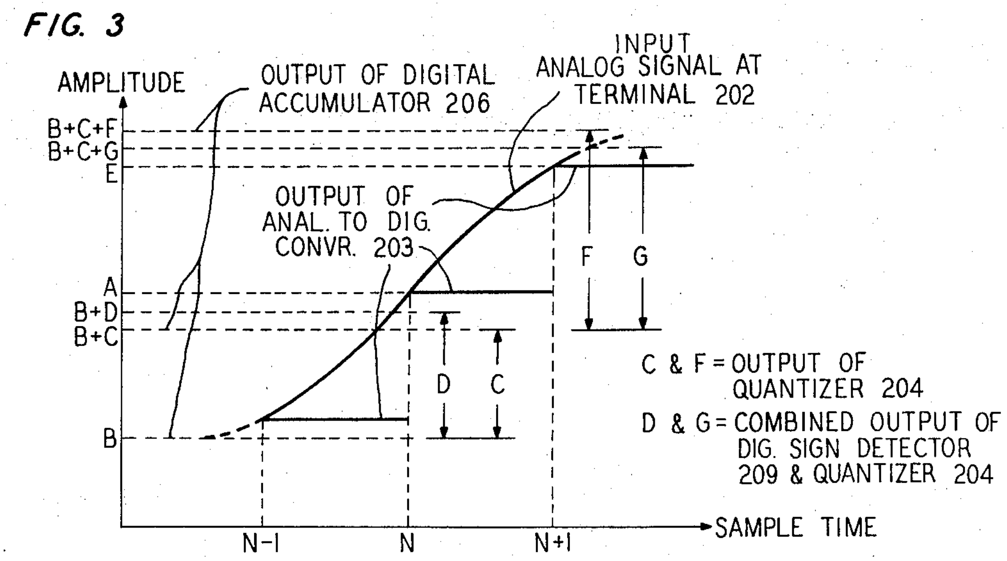
FIG. 3 is a waveform useful in explaining the quantizing schemes of the present invention.

An example of the quantizing process for an interval of an illustrative analog input message signal appearing at terminal 202 is illustrated in FIG. 3. At sample time N, the absolute value of the input message signal is shown to be A. As noted heretofore, at each sample instant analog-to-digital converter 203 converts the analog signal to a high quality digital signal having negligible quantization error. Therefore, the parallel digital code at the output of analog-to-digital converter 203 is representative of the magnitude of the analog signal at each sample time and in this case at sample time N. At sample time N, the digital signal fed back to digital subtractor circuit 205 from delay network 207 is shown, in FIG. 3, to be equal to B. Therefore, at sample time N, the magnitude of the digital difference signal at the output of digital subtractor circuit 205 is $A - B$.

Figure 4:
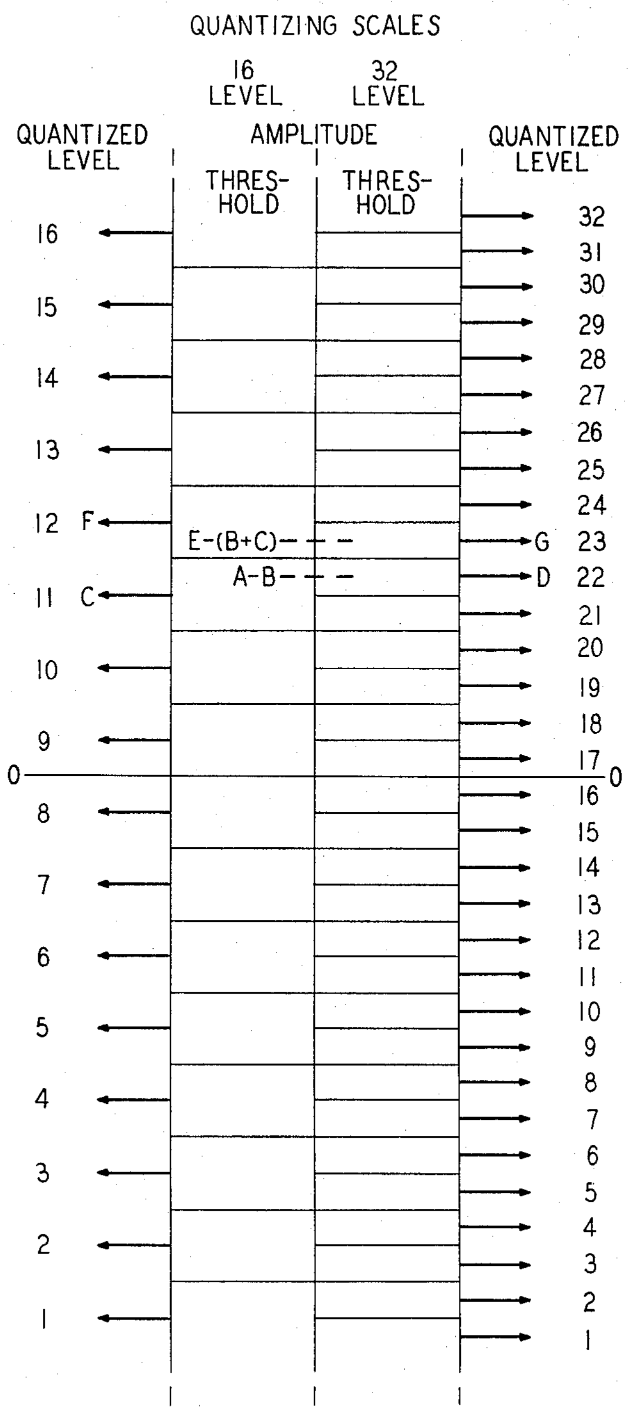
FIG. 4 illustrates the quantizing scales having respectively different numbers of quantizing levels.

To demonstrate the difference between lower quality quantizing with 16 possible levels and higher quality quantizing with 32 possible levels, an example of a 16-level quantizing scale together with a corresponding 32-level quantizing scale is illustrated in FIG. 4. When the amplitude of the difference signal at the output of digital subtractor circuit 205 is between the threshold values, the quantized level is as indicated on the respective scales. As shown on the 16-level quantizing scale of FIG. 4, quantizer circuit 204 quantizes the digital difference $A - B$ to produce a 4-bit parallel output code representing the 11th quantized level. Bit converter 213 transforms this code representing the 11th of 16 levels to a parallel pulse code representing the magnitude of the 11th quantized level, which in this case is C. Therefore, a pulse code representing the magnitude C appears at the output of bit converter 213. The pulse code representing the magnitude C is added by digital accumulator 213 to the pulse code representing the accumulation of previously accumulated quantized levels, heretofore assumed to be B. Thus, as shown in FIG. 3, the output of digital accumulator 206 at sample time N is a pulse code representing the magnitude $B + C$. Since as previously noted, the output of digital accumulator 206 represents the absolute magnitude of the 16-level coded input signal, $B + C$ is the 16-level representation of the input signal having a magnitude A at sample time N. The output of digital subtractor circuit 208 is therefore equal to the difference between A, the output of analog-to-digital converter 203, and $B + C$, the output of digital accumulator 206 at sample time N. The positive sign of this difference, represented by the presence or absence of a signal at the output of digital sign detector 209, indicates that a quantization level having a magnitude greater than C would more precisely represent the difference, $A - B$, to be quantized. Therefore the combination at the input to parallel-to-serial converter 210 of the fifth bit at the output of digital signal detector 209 with the four bits at the output of quantizer circuit 204 represents the 22nd quantized level on the 32-level quantization scale as illustrated in FIG. 4. As shown in FIGS. 3 and 4 the 22nd quantized level corresponds to a magnitude D, and therefore, $B + D$ is a 32-level representation of the input signal having a magnitude A at sample time N.

At the next sample instant of time $N + 1$ shown on FIGS. 3 and 4, the output of analog-to-digital converter 203 is equal to E and the output of delay network 207 is equal to $B + C$, the delayed 16-level representation of the output at sample time N. The difference between E and $B + C$ at the output of digital subtractor circuit 205 is quantized by quantizer circuit 204 into the 12th level on the 16-level quantization scale. A pulse code representing the magnitude F, corresponding to the 12th level on the 16-level scale, is produced by bit converter 213 and added to $B + C$, the previous value in in digital accumulator 206. Thus, at sample time $N+1$, $B+C+F$ is equal to the absolute magnitude of the 16-level quantized input signal. Digital sign detector 209 indicates a negative difference between E, the input signal, and $B+C+F$. Thus, the combination of this information bit with the four bits representing the 12th quantized level on the 16-level scale is representative of the 23rd quantized level, corresponding to a magnitude G, on the 32-level quantization scale. Therefore, at sample time $N+1$, $B+C+G$ is equal to the absolute magnitude of the 32 level quantized input signal.

At a given sample instant, therefore, the absolute magnitude of the 32-level coded input signal equals the sum of the 32-level coded difference signal at that instant, plus the absolute value of the 16-level coded input signal at the previous sample instant. Similarly, at a given sample instant, the absolute magnitude of the 16-level coded input signal equals the sum of the 16-level coded difference signal at that instant, plus the absolute value of the 16-level coded input signal at the previous instant. Therefore, at the receiver to be described in detail hereinafter, the high quality 32-level signal is recovered by summing the received 32-level difference signal with previously accumulated 32-level-to-16-level converted difference signals.

With reference again to FIG. 2A, the parallel digital output of parallel-to-serial converter 210 is transmitted over transmission path 211. At receiver 201 serial-to-parallel converter 212 decodes the transmitted serial code and produces a parallel pulse code on the five output leads equivalent to the combination of the 4-bit pulse code on the output leads of quantizer circuit 204 and the 1-bit pulse at the output of digital sign detector 209. The 5-bit pulse code at the output of serial-to-parallel converter 212 thus represents the number of the 32-level quantized difference signal at the output of digital subtractor circuit 205. However, four separable bits of the 5-bit output of serial-to-parallel converter 212 represent the number of the 16-level quantized difference signal.

The output leads of serial-to-parallel converter 212 upon which the 4-bit, 16-level difference signal is represented are connected to bit converter 214. Bit converter 214, similar in structure and function to the heretofore discussed bit converter 213, transforms each 4-bit input pulse code representing the number, from one to 16, of the quantized level on the 16-level scale to an 8-bit output pulse code representing the magnitude of the quantized level. Thus each 4-bit pulse code at the outputs of quantizer circuit 204 and serial-to-parallel converter 212 is converted to a pulse code on the output leads of bit converters 213 and 214, respectively, that represents the magnitude of the same quantization level on the 16-level quantization scale.

The output leads of bit converter are connected to digital accumulator 215 to produce a pulse code representing the summation of the magnitudes of the 16-level quantized difference signals. Delay network 216 delays the pulse code at the output of digital accumulator 215 by one sample instant. It should be noted that the pulse code at the output of delay networks 207 and 216 represents the magnitudes of equivalent 16-level coded signals so that the low quality signal at the receiver is equal to the low quality signal at the transmitter. As discussed heretofore, the pulse code at the output of delay network 207, and therefore delay network 216, is representative of the absolute magnitude of the 16-level coded high quality digital input signal.

The five output leads of serial-to-parallel converter 212 upon which the 5-bit 32-level difference signal is represented are connected to bit converter 217. Bit converter 217 converts the 5-bit input code representing the number, from one to 32, of the quantized level on the 32-level scale to an 8-bit parallel pulse code representing the magnitude of the quantized level on the 32-level quantizing scale. Bit converter 217 is similar to bit converters 213 and 214, and may be any compatible network known in the art capable of transforming each parallel digital input pulse code into a unique parallel digital output pulse code. The "read only" memory designated as SN-7488A by Texas Instrument, Incorporated, has also been found to be satisfactory for this purpose. The output leads of delay network 216 and the output leads of bit converter 217 are connected to digital adder circuit 218. At a given sample instant, digital adder circuit 218 produces a pulse code representative of the summation of the 32-level quantized difference signal at that sample instant plus the absolute magnitude of the 16-level quantized signal at the previous sample instant. The 8-bit parallel pulse code on the output leads of digital adder circuit 218 is fed to digital-to-analog converter 219 and the analog signal produced therein, representative of the absolute value of the 32-level quantized input signal, is fed to utilization device 220.

Figure 5:
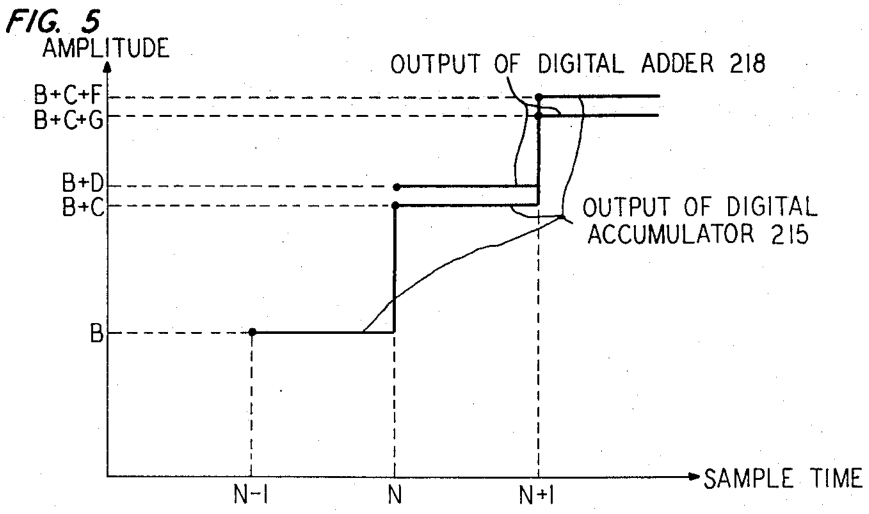
FIGS. 5 and 6 represent the magnitudes of the digital signals at various points in the system of the embodiment of the present invention illustrated in FIGS. 2A and 2B.

The decoding processing for the input signal segment whose quantization was discussed in connection with FIG. 3 is illustrated in FIG. 5. At sample time N, the output of bit converter 214 represents the magnitude of quantized level C on the 16-level scale while the output of bit converter 217 represents the magnitude D on the 32-level scale. As heretofore noted, the output of delay network 216 is equivalent to the output of delay network 207 at transmitter 200 and thus at sample time N is equal to B as shown in FIGS. 3 and 5. Therefore, at sample time N, the magnitude of the output of digital adder circuit 218 is equal to the output D of bit converter 217 plus the output B of delay network 216. Also at sample time N, the magnitude of the quantized level C at the output of bit converter 214 is added to B, the previous value in digital accumulator 215.

At the next sampling instant of time, $N+1$, the output of bit converter 214 represents the magnitude of the quantized level F while the output of bit converter 217 represents the magnitude of quantized level G, as discussed in connection with FIG. 3. The output of delay network 216 at sample time $N+1$ is equal to the output of digital accumulator 215 at sample time N which, as noted heretofore, equals $B+C$. The output of digital adder 218 is therefore equal to $B+C+G$ as illustrated in FIG. 5. Also, at sample time $N+1$, the magnitude of level F at the output of bit converter 214 is added to the previous value, $B+C$, in digital accumulator 215. It will be noted that at each sample instant the pulse code at the output of digital adder 218 represents the absolute magnitude of the 32-level coded input message signal while of the output of digital accumulator 215 represents the absolute magnitude of the 16-level coded input message signal. Therefore, at receiver 201 in FIG. 2A a 32-level re-construction of the input message signal may be made by digital-to-analog converter 219 for supply to utilization device 220.

Therefore a high quality 32-level signal has been supplied to utilization device 220 at receiver 201. As heretofore noted, however, the digital signal to receiver 201 may have to be re-transmitted to another distant location over a transmission path having a narrower bandwidth than transmission path 211. Thus, whereas five bits may be transmitted over transmission path 211 for each sampled difference signal, the re-transmission channel may only have a bandwidth capacity sufficient to transmit four bits for each sampled difference signal. Thus, only a 16-level signal may be re-transmitted rather than the 32-level signal transmitted from transmitter 200. Since, as heretofore noted, the absolute magnitude of the 32-level quality signal at the output of digital adder 218 is the sum of the absolute magnitude of the 16-level quality signal plus a 32-level difference signal, the 32-level may be derived therefrom for re-transmission. It is obvious, of course, that should a re-transmission channel have sufficient bandwidth capacity, the 32-level signal could be re-transmitted without re-quantization and the error associated therewith.

With reference again to the combination of FIGS. 2A and 2B, the 8-bit pulse code on the output leads of digital adder circuit 218 is passed through digital subtractor circuit 223 to quantizer circuit 224 in transmitter 221 where transmitter 221 is at the same location as receiver 201. The pulse code on the output leads of digital subtractor circuit 223, representing the difference between the absolute magnitude of the 32-level coded signal at the output of digital adder circuit 218 and the signal fed back from delay network 228, is quantized by quantizer circuit 224. The absolute magnitude of the digital signal at the output of digital subtractor circuit 223 is quantized into a digital signal having 16 quantization levels. The four output leads of quantizer 224, upon which are a parallel digital code representing one of 16 quantization levels, are connected to parallel-to-serial converter 225 for transmission over transmission path 229 to receiver 222.

The output pulse code of quantizer circuit 224 is also fed to bit converter 226. Bit converter 226, similar to bit converters 213 and 214, transforms the 4-bit input code representing the number, from one to 16, of the quantized level on the 16-level scale to an 8-bit code representative of the magnitude of the quantization level. The eight output leads of bit converter 226 are connected to digital accumulator 227 and a pulse code is produced therein representative of the sum of the 16-level quantized difference signals. The output pulse code of digital accumulator 227 is delayed one sample instant by delay network 228 and the delayed accumulated pulse code is then fed to a second input of digital subtractor circuit 223. The output of digital subtractor circuit 223 is therfore the difference between the digital representation of the absolute value of the 32-level coded input signal at a given sampling instant and the digital representation of the absolute magnitude of the 16-level coded input signal at the previous instant. As heretofore noted, the absolute magnitude of the 32-level coded signal at a given sample instant equals the sum of the 32-level coded difference signal at that instant and the absolute magnitude of the 16-level coded signal at a previous instant. Therefore, the digital signal at the output of digital subtractor circuit 223 represents the 32-level coded difference signal. Quantizer circuit 224 thus transforms the 32-level coded difference signal to the corresponding level on the 16-level quantization scale. At each sample instant, therefore, the output of quantizer circuit 224 is a digital signal representing a level on the 16-level quantizing scale and is equivalent to the level represented at the output of quantizer circuit 204. Since the output of quantizer circuit 224 in transmitter 221 is equal to the output of quantizer 204 in transmitter 200, the quantization error of the output signal of quantizer circuit 224 is no greater than the quantization error introduced by the 16-level quantization of the difference signal at the output of digital subtractor circuit 205. Since the signal input to parallel-to-serial converter 225 is equal to four of the five bits at the output of serial-to-parallel converter 212, the output of serial-to-parallel converter 212 could be tapped directly to parallel-to-serial converter 223. The remaining components of transmitter 221 would then be eliminated.

The serial digital signal received at receiver 222 by serial-to-parallel converter 230 is converted to a 4-bit parallel pulse code representing the quantization level at the output of quantizer circuit 224. Bit converter 231 converts the 4-bit pulse code at the output of serial-to-parallel converter 230, representing the number, from one to 16, of the quantized level on the 16-level scale, to an 8-bit parallel pulse code representing the magnitude of the transmitted quantized difference signal. Digital accumulator 232, connected to the output leads of bit converter 231, produces a pulse code representative of the sum of the magnitudes of the 16-level transmitted difference signals. Therefore, the output of digital accumulator 232, equivalent to the outputs of digital accumulators 206, 215 and 227, represents the absolute magnitude of the 16-level coded input signal. Digital-to-analog converter 233, connected to the output leads of digital accumulator 232, converts the pulse code representing the accumulated 16-level difference signals into analog format which in turn is fed to utilization device 234.

At each sample instant the difference between the analog signal at the output of digital-to-analog converter 233 and the input message signal at terminal 202 is equivalent to the 16-level quantization error introduced at transmitter 200 by quantizer circuit 204. Further, the 32-level signal supplied to utilization device 220 is not limited by the constraints of transmission path 229. Thus the difference signal transmitted by transmitter 211 at each sample time has both a 32-level quality and a 16-level quality. The 32-level signal is utilized at receiver 201, while the 16-level signal is re-transmitted to receiver 222 without introducing additional quantization error into the system.

Figure 6:
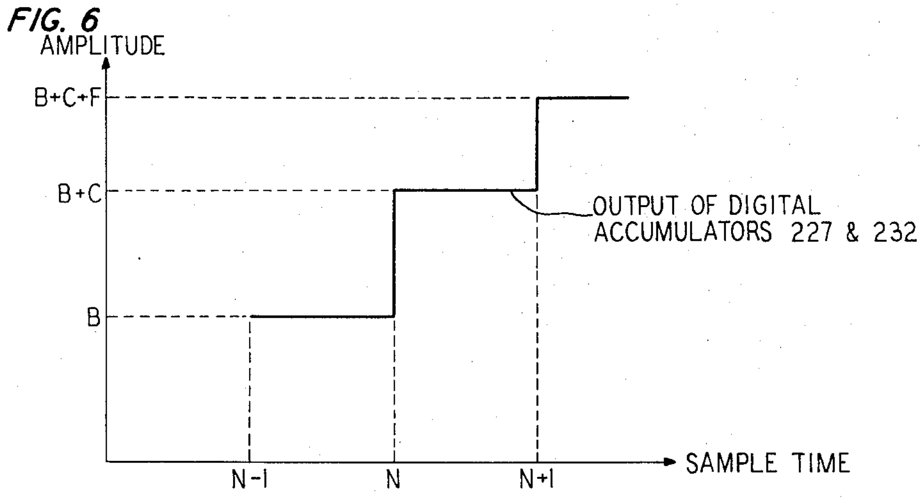

The quantizing and decoding processes at transmitter 221 and receiver 222, corresponding to the input signal segments of FIGS. 3 and 5, are illustrated in FIG. 6. It can be noted from FIG. 5 that at sample time N the output of digital adder circuit 218 is equal to $B + D$. As heretofore noted, the output of delay network 228 at transmitter 221 is equivalent to the output of delay network 207 at transmitter 200 and is therefore equal to B, as shown in FIGS. 3, 5 and 6. Therefore, at sample time N the output of digital subtractor circuit 223 is equal to D. Quantizer circuit 224 quantizes D, in accordance with the 16-level quantization scale illustrated in FIG. 4, to a 4-bit code, representing the 11th quantized level, at the outputs of quantizer circuit 224 and serial-to-parallel converter 230. Bit converters 226 and 231 transform the 4-bit code to an 8-bit code representing the magnitude C. At the same instant, quantized level C is added to B, the previous value in digital accumulators 227 and 232. Thus the outputs of digital accumulators 227 and 232 at sample time N are both equal to $B + C$. At the next sample instant at time, $N + 1$, the output of digital adder circuit 218 is equal to $B + C + G$. Therefore, the output of digital subtractor circuit 223 is equal to the difference between $B + C + G$ and $B + C$. The difference G is quantized by quantizer circuit 224 to the 12th level on the 16-level scale having a magnitude F. The outputs of digital accumulator 227 at transmitter 221 and digital accumulator 232 at receiver 222 at sample time $N + 1$, are, therefore, both equal to $B + C + F$. Therefore, in FIGS. 2A and 2B, the analog signal re-constructed by digital-to-analog converter 233 has a quantization error at each sample instant equivalent to the quantization error introduced at transmitter 200 by quantizer circuit 204. The decoded analog signal at the output of digital-to-analog converter 233 therefore has a 16-level quality and transmitter 221 has not introduced a second quantization component into the system.

The above-described embodiment is illustrative of the application of the principles of the invention. Other embodiments may be devised by those skilled in the art without departing from the spirit and scope thereof.

What is claimed is:

1. A transmitter for transmitting coded differential signals at fixed periodic intervals comprising a transmitter input terminal for receiving an input message signal, quantizing means for encoding differential input signals to first digital signals each having one of a first predetermined number of quantizing levels, a digital accumulator connected to said quantizing means to add each quantizing level of said first digital signal to previously accumulated quantizing levels, a delay network connected to said digital accumulator to delay said accumulated first digital signal at least one of said fixed periodic intervals, first subtraction means connected to said transmitter input terminal, the output of said delay network, and the input of said quantizing means to produce a differential input signal to said quantizing means at each of said fixed periodic intervals by subtracting the delayed signal from said input message signal, second subtraction means connected to said transmitter input terminal and the output of said digital accumulator to produce a second differential signal at each of said fixed periodic intervals by subtracting said accumulated first digital signal from said input message signal, a transmitter output terminal, signal combining means connected to said second subtraction means, said quantizing means and said transmitter output terminal to produce a second digital signal at said transmitter output terminal having one of a second predetermined number of quantizing levels representing the combination of each of said first digital signals and each of said second difference signals, whereby said second predetermined number of quantizing levels of said second digital signal at said transmitter output terminal is greater than said first predetermined number of quantizing levels, and a signal having said first predetermined number of quantizing levels may be derived from said second digital signal.

2. A transmitter in accordance with claim 1 wherein said first digital signal having one of said first predetermined number of quantizing levels is represented by a first predetermined number of bits, said second difference signal is represented by a second predetermined number of bits, and said signal combining means combines said first predetermined number of bits and said second predetermined number of bits to produce said second digital signal.

3. A transmitter in accordance with claim 1 wherein said input message signal is an analog signal, an analog-to-digital converter is connected between said transmitter input terminal and said first subtraction means to convert said analog signal at said transmitter input terminal to digital format, one input of said second subtraction means is connected to the output of said analog-to-digital converter, and a second input of said second subtraction means is connected to said digital accumulator.

4. A transmitter in accordance with claim 3 wherein said signal combining means is a parallel-to-serial converter that transforms the combination of the parallel output of said quantizer and the parallel ouput of said second subtraction means to serial digital format.

5. a receiver for receiving coded differential signals having one of a first predetermined number of quantizing levels at fixed periodic intervals comprising a receiver input terminal for receiving digital differential signals, a digital converter connected to said receiver input terminal to convert each of said received digital differential signals to a first digital signal having one of a second predetermined number of quantizing levels, said second predetermined number of quantizing levels being less than said first predetermined number of quantizing levels, a digital accumulator connected to said digital converter for adding the quantizing level of said second digital signal to previously accumulated quantizing levels, a delay network connected to said digital accumulator to delay said accumulated second digital signal at least one of said fixed periodic intervals, a receiver output terminal, and a digital adder connected to said receiver input terminal, the output of said delay network, and said receiver output terminal to add the quantizing level of said received digital differential signal to the delayed accumulated second digital signal, whereby a signal having said first predetermined number of quantizing levels and a signal having said second predetermined number of quantizing levels may be derived from the signal at said receiver output terminal.

6. A receiver in accordance with claim 5 wherein a digital-to-analog converter is connected between the output of said digital adder and said receiver output terminal to convert the digital signal at the output of said digital adder to analog format.

7. A receiver in accordance with claim 6 wherein a serial-to-parallel converter is connected between said receiver input terminal, said digital adder and said digital converter to convert the serial digital differential signals at said receiver input terminal to a parallel digital format.

8. A differential pulse code communications system for transmitting and receiving coded differential signals at fixed periodic intervals comprising a transmitter input terminal for receiving an input message signal, quantizing means for encoding differential input signals to first digital signals each having one of a first predetermined number of quantizing levels, a first digital accumulator connected to said quantizing means and to add each quantizing level of said first digital signal to previously accumulated quantizing levels, a first delay network connected to said first digital accumulator to delay said accumulated first digital signal at least one of said fixed periodic intervals, first subtraction means connected to said transmitter input terminal, the output of said delay network, and the input of said quantizing means to produce a differential input signal to said quantizing means at each of said fixed periodic intervals by subtracting the delayed signal from said input message signal, second subtraction means connected to said transmitter input terminal and the output of said first digital accumulator to produce a second differential signal from said input message signal at each of said fixed periodic intervals by subtracting said accumulated first digital signal from said input message signal, a transmitter output terminal, signal combining means connected to said second subtraction means, said quantizing means and said transmitter output terminal to produce a second digital signal at said transmitter output terminal having one of a second predetermined number of quantizing levels representing the combination of each of said first digital signals and each of said second difference signals, said second predetermined number of quantizing levels being greater than said first predetermined number of quantizing levels, a receiver input terminal, a transmission medium interconnecting said transmitter output terminal and said receiver input terminal for transmitting said second digital signal having one of said second predetermined number of quantizing levels to said receiver input terminal, a digital converter connected to said receiver input terminal to convert the received digital signal at said receiver input terminal to a third digital signal having one of said first predetermined number of quantizing levels, a second digital accumulator connected to said digital converter for adding the quantizing level of said third digital signal to previously accumulated quantizing levels, a second delay network connected to said second digital accumulator to delay said accumulated third digital signal at least one of said fixed periodic intervals, receiver output terminal, and a digital adder connected to said receiver input terminal, the output of said second delay network, and said receiver output terminal to add the quantizing level of said received digital signal at said receiver input terminal to the delayed accumulated third digital signal, whereby a signal having said first predetermined number of quantizing levels and a signal having said second predetermined number of quantizing levels may be derived from the signal at said receiver output terminal.

9. A differential pulse code communications system in accordance with claim 8 wherein said input message signal is an analog signal, an analog-to-digital converter is connected between said transmitter input terminal and said first subtraction means to convert said input message signal to analog format, one input of said second subtraction means is connected to the output of said analog-to-digital converter, a second input of said second subtraction means is connected to said first digital accumulator and a digital-to-analog converter is connected between said digital adder and said receiver output terminal to convert the digital signal at the output of said digital adder to analog format.

* * * * *